(12) United States Patent
Lee

(10) Patent No.: US 8,251,690 B2
(45) Date of Patent: Aug. 28, 2012

(54) MOLD ASSEMBLY INCLUDING A FIXING BOLT AND A SCREW BOLT

(75) Inventor: Hsin-Ho Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 16 days.

(21) Appl. No.: 12/882,154

(22) Filed: Sep. 14, 2010

(65) Prior Publication Data

US 2011/0262581 A1 Oct. 27, 2011

(30) Foreign Application Priority Data

Apr. 23, 2010 (TW) ................................ 99112809 A

(51) Int. Cl.
*B29C 45/66* (2006.01)
(52) U.S. Cl. ...................... 425/185; 425/190; 425/192 R
(58) Field of Classification Search .................. 425/185, 425/190, 192 R
See application file for complete search history.

(56) References Cited

U.S. PATENT DOCUMENTS 4,551,084 A * 11/1985 Lake .............................. 425/185
4,959,002 A * 9/1990 Pleasant .................... 425/192 R

* cited by examiner

*Primary Examiner* — Tim Heitbrink
(74) *Attorney, Agent, or Firm* — Altis Law Group, Inc.

(57) ABSTRACT

A mold includes a die block, a core, two fixing bolts and four screw bolts. The die block includes a top surface, and two side surfaces. The top surface defines a cavity receiving the core. The core includes two opposite outer side surfaces. One side surface defines a first and a second guiding slots extended to the other side surface and communicating with the cavity. One outer side surface defines a third guiding slot aligned with the first guiding slot. The other outer side surface defines a fourth guiding slot aligned with the second guiding slot. One of the fixing bolts inserts into the first and the third guiding slots. The other one of the fixing bolts inserts into the second and fourth guiding slots. The at least two screw bolts respectively engage with the die block until resisting on a corresponding fixing bolt.

20 Claims, 3 Drawing Sheets

MOLD ASSEMBLY INCLUDING A FIXING BOLT AND A SCREW BOLT

BACKGROUND

1. Technical Field

The present disclosure relates to a mold assembly.

2. Description of Related Art

Mold assemblies are widely used for manufacturing optical articles, such as light guide plates, lenses, etc. A typical mold assembly generally includes a die block and a core. The die block includes two opposite side surfaces. One of the side surfaces defines a cavity, the other side surface defines a number of threaded holes. The core is firmly fixed in the cavity by a number of screw bolts engaging with the threaded holes. However, forces exerted on the screw bolts are unique and causes the core to deviate from the desired portion. This results in a reduction of alignment and assembly precision is less than satisfactory, adversely affecting the quality of the optical articles molded by the mold assembly.

Therefore, it is desirable to provide a mold assembly which can overcome the above problems.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Embodiments of the present disclosure will now be described in detail below and with reference to the drawings.

Figure 1:
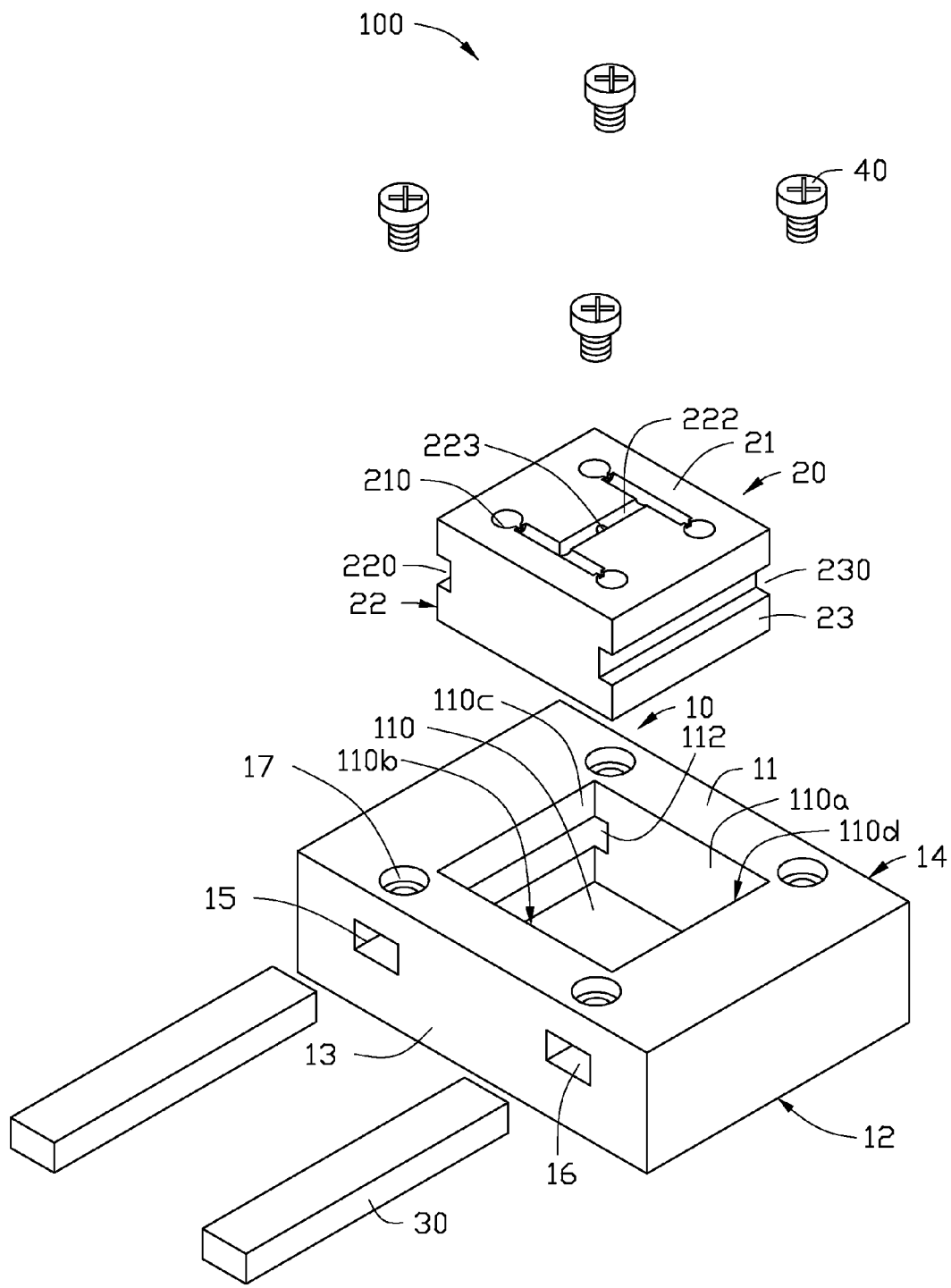
FIG. 1 is an exploded, isometric view of a mold assembly, according to an exemplary embodiment.
Figure 2:
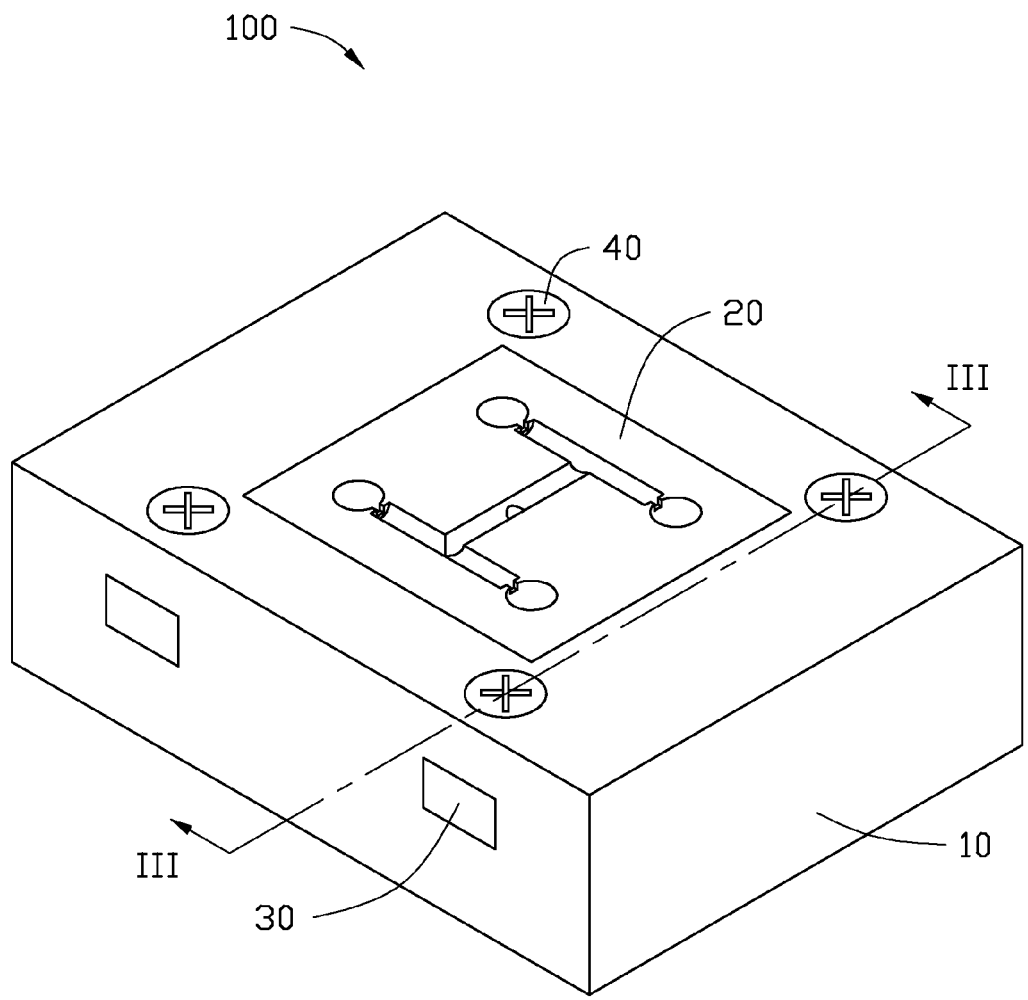
FIG. 2 is an assembled, isometric view of the mold assembly of FIG. 1.

Referring to FIGS. 1-2, a mold assembly 100, according to an exemplary embodiment, includes a die block 10, a core 20 received in the die block 10, two fixing bolts 30, and four screw bolts 40. The fixing bolts 30 and the screw bolts 40 are configured for firmly fixing the core 20 to the die block 10.

The die block 10 is cuboid in shape and includes a top surface 11, a bottom surface 12 opposite to the top surface 11, a first side surface 13, and a second side surface 14 opposite to the first side surface 13. The die block 10 defines a cavity 110 in the top surface 11. The cavity 110 is generally cuboid shaped and characterized by a first inner side surface 110a, a second inner side surface 110b opposite to the first inner side surface 110a, a third inner side surface 110c perpendicular to and adjacent to the first inner side surface 110a and the second inner side surface 110b, and a fourth inner side surface 110d opposite to the third inner side surface 110c.

The die block 10 defines a first guiding slot 15 and a second guiding slot 16. Both the first guiding slot 15 and the second guiding slot 16 are columnar in shape, extend from the first side surface 13 to the second side surface 14, and thus communicate the cavity 110 with outside. In this present embodiment, the first guiding slot 15 also extends though the first inner side surface 110a, cutting out material in the third inner side surface 110c and the first inner side surface 110a, and thus forming a first cutout 112 in the first inner side surface 110a and the third inner side surface 110c. The second guiding slot 16 also extends through the first inner side surface 110a, cutting out material in the fourth inner surface 110d and the first inner side surface 110a, and thus forming a second cutout (not shown) in the first inner side surface 110a and the fourth inner side surface 110d. The top surface 11 of the die block 10 also defines four threaded holes 17. The four threaded holes 17 surround the cavity 110, positioned at four corners of the cavity 110, and communicate with the first guiding slot 15 and the second guiding slot 16, respectively.

The shape of the core 20 corresponds to that of the cavity 110. Thus, the core 20 can be fittingly received in the cavity 110 with minimal allowance for clearance. The core 20 includes a molding surface 21, a first outer side surface 22, a second outer side surface 23 opposite to the first outer side surface 22. Both the first outer side surface 22 and the second outer side surface 23 are perpendicular to and adjacent to the molding surface 21. The molding surface 21 defines a number of part cavities 210 and a number of flow runners 222. In the center of the flow runners 222 may be a sprue 223. In operation, resin is ejected from the sprue 223 and spreads to the flow runners 222, gates (not shown) and into the part cavities 210. The first outer side surface 22 defines a third guiding slot 220 aligned with the first guiding slot 15 and the first cutout 112. The second outer side surface 23 defines a fourth guiding slot 230 aligned with the second guiding slot 16 and the second cutout.

The shape of the fixing bolt 30 corresponds with that of the first and second guiding slots 15 and 16.

Figure 3:
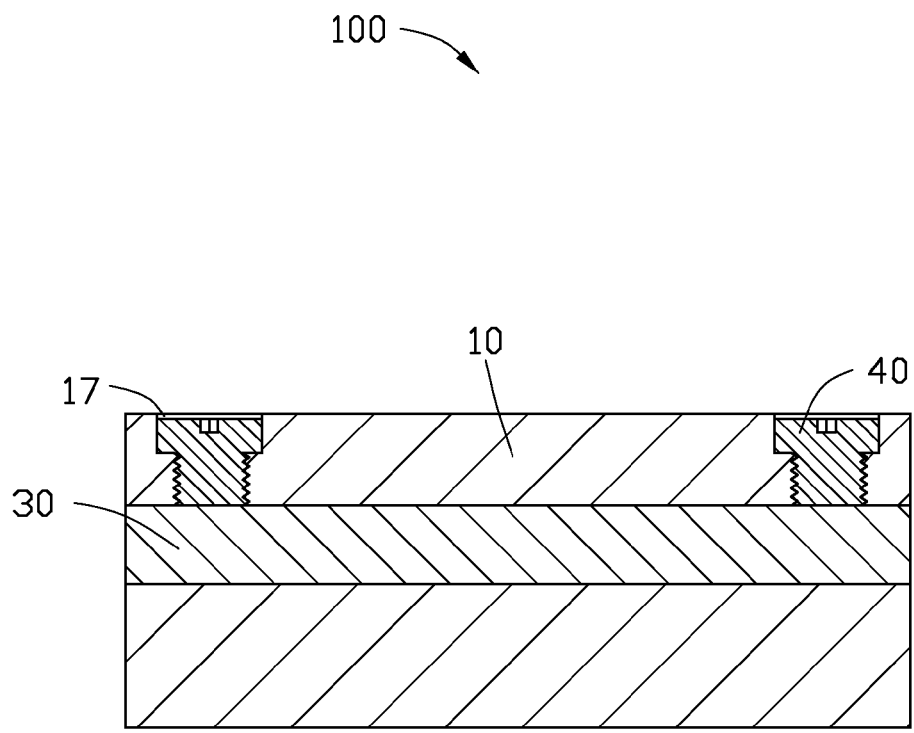
FIG. 3 is a cross-sectional view taken along a line III-III of FIG. 2.

Also referring to FIG. 3, in assembly, the core 20 is installed into the cavity 110. Then one of the two fixing bolts 30 is inserted into the first guiding slot 15 and the third guiding slot 220 through the first cutout 112, the other one of the two fixing bolts 30 is inserted into the second guiding slot 16 and the fourth guiding slot 230 through the second cutout. The four screw bolts 40 are respectively engaged with the four threaded holes 17 until resisting on a corresponding fixing bolt 30, firmly supporting the core 20 into the cavity 110. As the force applied by the screw bolts 40 to the core 20 is evenly redistributed by the fixing bolts 30, assembly precision of the core 20 within the cavity 110 is improved.

It should be noted that the number of the screw bolts 40 and the threaded holes 17 are not limited to four, but can be any number depending on requirements. In alternative embodiments, the number of the screw bolts 40 and the threaded holes 17 may be two, three or more than four.

It will be understood that the above particular embodiments are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A mold assembly, comprising:
    a die block comprising:
        a top surface defining a cavity and at least two threaded holes;
        a first side surface; and
        a second side surface opposite to the first side surface; wherein the die block defines a first guiding slot and a second guiding slot, and both the first guiding slot and the second guiding slot extend from the first side surface to the second side surface and are communicated with the cavity; and
    a core received in the cavity, and comprising:

a first outer side surface; and
a second outer side surface opposite to the first outer side surface, wherein the first outer side surface defines a third guiding slot aligned with the first guiding slot, and the second outer side surface defines a fourth guiding slot aligned with the second guiding slot; and
a first and a second fixing bolts and at least two screw bolts, wherein the first fixing bolt is received in the first and the third guiding slots, the second fixing bolt is received in the second and the fourth guiding slots, the at least two screw bolts respectively engage in the at least two threaded holes of the die block, and ends of the at least two screw bolts abutting against the first and second fixing bolts to firmly support the core in the cavity.

2. The mold assembly of claim 1, wherein the shape of the core corresponds to that of the cavity, and the core is received in the cavity with minimal allowance for clearance.

3. The mold assembly of claim 2, wherein both the cavity and the core are cuboid in shape.

4. The mold assembly of claim 2, wherein the cavity comprises a first inner side surface, a second inner side surface opposite to the first inner side surface, a third inner side surface perpendicular to and adjacent to the first inner side surface and the second inner side surface, and a fourth inner side surface opposite to the third inner side surface, the first guiding slot extends through the first inner side surface and cuts out material in the third inner side surface and the first inner side surface, thus forming a first cutout in the first inner side surface and the third inner side surface, and the first fixing bolt inserts into the first cutout.

5. The mold assembly of claim 4, wherein the second guiding slot extends through the first inner side surface and cuts out material in the fourth inner side surface and the first inner side surface, thus forming a second cutout in the first inner side surface and the fourth inner side surface, and the second fixing bolt inserts into the second cutout.

6. The mold assembly of claim 3, wherein the at least two threaded holes comprise four threaded holes, the four threaded holes surround the cavity and are positioned at four corners of the cavity, two of the four threaded holes communicate with the first guiding slot, the other two of the four threaded holes communicate with the second guiding slot, and the at least two screw bolts correspondingly comprise four screw bolts.

7. The mold assembly of claim 1, wherein the shape of the first fixing bolt corresponds with that of the first guiding slot, and the shape of the second fixing bolt corresponds with that of the second guiding slot.

8. The mold assembly of claim 7, wherein the first and second fixing bolts, and the first and second guiding slots, are all columnar in shape.

9. The mold assembly of claim 1, wherein the core further comprises a molding surface, the molding surface defines a plurality of part cavities and a plurality of flow runners communicated with the part cavities, and one of the flow runners defines a sprue.

10. A mold assembly, comprising:
a die block comprising a top surface, the top surface defining a cavity, the cavity comprising a first inner side surface;
a core received in the cavity, the core comprising a first outer side surface abutting against the first inner side surface of the cavity, the first inner side surface defining a first slot extending along an abutting line between the first inner side surface and the first outer side surface, the first outer side surface defining a second slot extending along the abutting line between the first inner side surface and the first outer side surface, and the first slot aligning with the second slot; and
a first fixing bolt inserted into the first and second slots, wherein a portion of the first fixing bolt is received in the first slot, and the other portion of the first fixing bolt is received in the second slot.

11. The mold assembly of claim 10, wherein the cavity further comprises a second inner side surface opposite to the first inner side surface, the core further comprises a second outer side surface opposite to the first outer side surface, the second inner side surface abuts against the second outer side surface, the second inner side surface defines a third slot extending along the abutting line between the second inner side surface and the second outer side surface, the second outer side surface defines a fourth slot extending along the abutting line between the second inner side surface and the second outer side surface, the third slot aligns with the fourth slot, the mold assembly further comprises a second fixing bolt, the second fixing bolt inserts into the third and fourth slots, a portion of the second fixing bolt is received in the third slot, and the other portion of the second fixing bolt is received in the fourth slot.

12. The mold assembly of claim 11, wherein die block further comprises a first side surface and a second side surface opposite to the first side surface, the die block defines a first guiding slot and a second guiding slot, both the first guiding slot and the second guiding slot extend from the first side surface to the second side surface and are communicated with the cavity, the first guiding slot aligns with the first and second slots, the second guiding slot aligns with the third and fourth slots, the first fixing bolt is inserted into the first guiding slot and extends through the first and second slots such that the first fixing bolt supports and fixes the core in the cavity, and the second fixing bolt is inserted into the second guiding slot and extends through the third and fourth slots such that the second fixing bolt supports and fixes the core in the cavity.

13. The mold assembly of claim 12, wherein the top surface further defines at least two threaded holes, the at least two threaded holes are communicated with the first and second guiding slots, respectively, the at least two screw bolts respectively engage in the at least two threaded holes of the die block, and ends of the at least two screw bolts abut against surfaces of the first and second fixing bolts, respectively.

14. The mold assembly of claim 10, wherein the shape of the core corresponds to that of the cavity, and the core is received in the cavity with minimal allowance for clearance.

15. The mold assembly of claim 10, wherein both the cavity and the core are cuboid in shape.

16. The mold assembly of claim 13, wherein the at least two threaded holes comprise four threaded holes, the four threaded holes surround the cavity and are positioned at four corners of the cavity, two of the four threaded holes communicate with the first guiding slot, the other two of the four threaded holes communicate with the second guiding slot, and the at least two screw bolts correspondingly comprise four screw bolts.

17. The mold assembly of claim 11, wherein the shape of the first fixing bolt corresponds with that of the first guiding slot, and the shape of the second fixing bolt corresponds with that of the second guiding slot.

18. The mold assembly of claim 17, wherein the first and second fixing bolts, and the first and second guiding slots, are all columnar in shape.

19. The mold assembly of claim 10, wherein the core further comprises a molding surface, the molding surface defines a plurality of part cavities and a plurality of flow runners communicated with the part cavities, and one of the flow runners defines a sprue.

20. A mold assembly, comprising:
- a die block comprising a top surface, the top surface defining a cavity, the cavity comprising a first inner side surface defining a first groove;
- a core received in the cavity, the core comprising a first outer side surface abutting against the first inner side surface of the cavity, the first outer side surface defining a second groove facing the first groove, the first groove and the second groove defining a receiving hole extending along an abutting line between the first inner side surface and the first outer side surface; and
- a first fixing bolt inserted into the receiving hole, a portion of the first fixing bolt being received in the first groove, and the other portion of the first fixing bolt being received in the second groove.

* * * * *